(12) United States Patent
Rowlands et al.

(10) Patent No.: US 11,144,457 B2
(45) Date of Patent: Oct. 12, 2021

(54) ENHANCED PAGE LOCALITY IN NETWORK-ON-CHIP (NOC) ARCHITECTURES

(71) Applicant: NetSpeed Systems, Inc., San Jose, CA (US)

(72) Inventors: Joseph Rowlands, San Jose, CA (US); Joji Philip, San Jose, CA (US)

(73) Assignee: NETSPEED SYSTEMS, INC., San Jose, CA (US)

(*) Notice: Subject to any disclaimer, the term of this patent is extended or adjusted under 35 U.S.C. 154(b) by 335 days.

(21) Appl. No.: 16/258,404

(22) Filed: Jan. 25, 2019

(65) Prior Publication Data

US 2019/0258572 A1    Aug. 22, 2019

Related U.S. Application Data

(60) Provisional application No. 62/634,100, filed on Feb. 22, 2018.

(51) Int. Cl.
*G06F 12/0813* (2016.01)
*G06F 12/0811* (2016.01)
(Continued)

(52) U.S. Cl.
CPC ........ *G06F 12/0813* (2013.01); *G06F 9/3838* (2013.01); *G06F 12/0811* (2013.01);
(Continued)

(58) Field of Classification Search
CPC ..... H04L 45/60; H04L 45/586; H04L 45/302; H04L 67/00; G06F 12/0813;
(Continued)

(56) References Cited

U.S. PATENT DOCUMENTS 4,409,838 A    10/1983   Schomberg
4,933,933 A     6/1990   Daily et al.
(Continued)

FOREIGN PATENT DOCUMENTS

CN    103684961 A    3/2014
JP       5936793      5/2016
(Continued)

OTHER PUBLICATIONS

Ababei, C., et al., Achieving Network on Chip Fault Tolerance by Adaptive Remapping, Parallel & Distributed Processing, 2009, IEEE International Symposium, 4 pgs.
(Continued)

*Primary Examiner* — Warner Wong
(74) *Attorney, Agent, or Firm* — Spectrum IP Law Group LLC

(57) ABSTRACT

Aspects of the present disclosure relate to page locality based memory access request processing in a network-on-chip (NoC) architecture. In an example implementation, the proposed method includes determining, at an arbitrator, while selecting a NoC agent from a plurality of NoC agents for request processing for a forthcoming round, if current NoC agent of current round is processing a packet stream and if said packet stream is completely processed at the end of said current round, wherein processing of the packet stream enables cluster requests to be processed at same part of said memory and enhances page locality; and re-selecting, at said arbitrator, said current NoC agent as the NoC agent for the forthcoming round if said packet stream processing is not completed at the end of said current round, so as to enable said current NoC agent to complete processing of said packet stream in said forthcoming round.

18 Claims, 12 Drawing Sheets

(51) Int. Cl.
*H04L 12/725* (2013.01)
*H04L 12/773* (2013.01)
*G06F 9/38* (2018.01)
H04L 12/713 (2013.01)

(52) U.S. Cl.
CPC ............ *H04L 45/302* (2013.01); *H04L 45/60* (2013.01); *H04L 45/586* (2013.01)

(58) Field of Classification Search
CPC .............. G06F 12/0811; G06F 9/3838; G06F 2115/02; G06F 15/163; G06F 15/17375; G06F 15/17381; G06F 15/17393; G06F 15/80; G06F 15/8015; G06F 15/8023; G06F 15/803; G06F 15/16; G06F 13/00
See application file for complete search history.

(56) References Cited

U.S. PATENT DOCUMENTS

| | | | |
|---|---|---|---|
| 5,105,424 A | | 4/1992 | Flaig et al. |
| 5,163,016 A | | 11/1992 | Har'El et al. |
| 5,267,235 A | * | 11/1993 | Thacker .............. H04L 12/5601 340/2.24 |
| 5,355,455 A | | 10/1994 | Hilgendorf et al. |
| 5,432,785 A | | 7/1995 | Ahmed et al. |
| 5,563,003 A | | 10/1996 | Suzuki et al. |
| 5,583,990 A | | 12/1996 | Birrittella et al. |
| 5,588,152 A | | 12/1996 | Dapp et al. |
| 5,764,740 A | | 6/1998 | Holender |
| 5,790,554 A | | 8/1998 | Pitcher et al. |
| 5,859,981 A | | 1/1999 | Levin et al. |
| 5,930,256 A | * | 7/1999 | Greene ............... H04L 12/5601 370/397 |
| 5,991,308 A | | 11/1999 | Fuhrmann et al. |
| 5,999,530 A | | 12/1999 | LeMaire et al. |
| 6,003,029 A | | 12/1999 | Agrawal et al. |
| 6,029,220 A | | 2/2000 | Iwamura et al. |
| 6,058,385 A | | 5/2000 | Koza et al. |
| 6,101,181 A | | 8/2000 | Passint et al. |
| 6,108,739 A | | 8/2000 | James et al. |
| 6,249,902 B1 | | 6/2001 | Igusa et al. |
| 6,301,642 B1 | * | 10/2001 | Jones .................. G06F 12/0215 710/107 |
| 6,314,487 B1 | | 11/2001 | Hahn et al. |
| 6,377,543 B1 | | 4/2002 | Grover et al. |
| 6,415,282 B1 | | 7/2002 | Mukherjea et al. |
| 6,674,720 B1 | | 1/2004 | Passint et al. |
| 6,701,361 B1 | | 3/2004 | Meier |
| 6,711,717 B2 | | 3/2004 | Nystrom et al. |
| 6,778,531 B1 | | 8/2004 | Kodialam et al. |
| 6,925,627 B1 | | 8/2005 | Longway et al. |
| 6,967,926 B1 | | 11/2005 | Williams, Jr. et al. |
| 6,983,461 B2 | | 1/2006 | Hutchison et al. |
| 7,046,633 B2 | | 5/2006 | Carvey |
| 7,065,730 B2 | | 6/2006 | Alpert et al. |
| 7,143,221 B2 | | 11/2006 | Bruce et al. |
| 7,260,745 B1 | * | 8/2007 | Edwards ............. G06F 11/3636 714/25 |
| 7,318,214 B1 | | 1/2008 | Prasad et al. |
| 7,379,424 B1 | | 5/2008 | Krueger |
| 7,437,518 B2 | | 10/2008 | Tsien |
| 7,461,236 B1 | | 12/2008 | Wentzlaff |
| 7,509,619 B1 | | 3/2009 | Miller et al. |
| 7,525,978 B1 | * | 4/2009 | Tabatabaee .......... H04L 47/522 370/411 |
| 7,564,865 B2 | | 7/2009 | Radulescu |
| 7,583,602 B2 | | 9/2009 | Bejerano et al. |
| 7,590,959 B2 | | 9/2009 | Tanaka |
| 7,693,064 B2 | | 4/2010 | Thubert et al. |
| 7,701,252 B1 | | 4/2010 | Chow et al. |
| 7,724,735 B2 | | 5/2010 | Locatelli et al. |
| 7,725,859 B1 | | 5/2010 | Lenahan et al. |
| 7,774,783 B2 | | 8/2010 | Toader |
| 7,808,968 B1 | | 10/2010 | Kalmanek, Jr. et al. |
| 7,853,774 B1 | | 12/2010 | Wentzlaff |
| 7,917,885 B2 | | 3/2011 | Becker |
| 7,957,381 B2 | | 6/2011 | Clermidy et al. |
| 7,973,804 B2 | | 7/2011 | Mejdrich et al. |
| 8,018,249 B2 | | 9/2011 | Koch et al. |
| 8,020,163 B2 | | 9/2011 | Nollet et al. |
| 8,020,168 B2 | | 9/2011 | Hoover et al. |
| 8,050,256 B1 | | 11/2011 | Bao et al. |
| 8,059,551 B2 | | 11/2011 | Milliken |
| 8,098,677 B1 | | 1/2012 | Pleshek et al. |
| 8,099,757 B2 | | 1/2012 | Riedl et al. |
| 8,136,071 B2 | | 3/2012 | Solomon |
| 8,203,938 B2 | | 6/2012 | Gibbings |
| 8,261,025 B2 | | 9/2012 | Mejdrich et al. |
| 8,281,297 B2 | | 10/2012 | Dasu et al. |
| 8,306,042 B1 | | 11/2012 | Abts |
| 8,307,165 B1 | * | 11/2012 | Keil .................... G06F 13/1631 711/141 |
| 8,312,402 B1 | | 11/2012 | Okhmatovski et al. |
| 8,352,774 B2 | | 1/2013 | Elrabaa |
| 8,407,425 B2 | | 3/2013 | Gueron et al. |
| 8,412,795 B2 | | 4/2013 | Mangano et al. |
| 8,438,578 B2 | | 5/2013 | Hoover et al. |
| 8,448,102 B2 | | 5/2013 | Komachuk et al. |
| 8,490,110 B2 | | 7/2013 | Hoover et al. |
| 8,492,886 B2 | | 7/2013 | Or-Bach et al. |
| 8,503,445 B2 | | 8/2013 | Lo |
| 8,514,889 B2 | | 8/2013 | Jayasimha |
| 8,541,819 B1 | | 9/2013 | Or-Bach et al. |
| 8,543,964 B2 | | 9/2013 | Ge et al. |
| 8,572,353 B1 | | 10/2013 | Bratt et al. |
| 8,601,423 B1 | | 12/2013 | Philip et al. |
| 8,614,955 B2 | | 12/2013 | Gintis et al. |
| 8,619,622 B2 | | 12/2013 | Harrand et al. |
| 8,635,577 B2 | | 1/2014 | Kazda et al. |
| 8,661,455 B2 | | 2/2014 | Mejdrich et al. |
| 8,667,439 B1 | | 3/2014 | Kumar et al. |
| 8,705,368 B1 | | 4/2014 | Abts et al. |
| 8,711,867 B2 | | 4/2014 | Guo et al. |
| 8,717,875 B2 | | 5/2014 | Bejerano et al. |
| 8,726,295 B2 | | 5/2014 | Hoover et al. |
| 8,738,860 B1 | | 5/2014 | Griffin et al. |
| 8,793,644 B2 | | 7/2014 | Michel et al. |
| 8,798,038 B2 | | 8/2014 | Jayasimha et al. |
| 8,819,611 B2 | | 8/2014 | Philip et al. |
| 8,885,510 B2 | | 11/2014 | Kumar et al. |
| 9,210,048 B1 | | 12/2015 | Marr et al. |
| 9,223,711 B2 | | 12/2015 | Philip et al. |
| 9,244,845 B2 | | 1/2016 | Rowlands et al. |
| 9,244,880 B2 | | 1/2016 | Philip et al. |
| 9,253,085 B2 | | 2/2016 | Kumar et al. |
| 9,294,354 B2 | | 3/2016 | Kumar |
| 9,319,232 B2 | | 4/2016 | Kumar |
| 9,444,702 B1 | | 9/2016 | Raponi et al. |
| 9,471,726 B2 | | 10/2016 | Kumar et al. |
| 9,473,359 B2 | | 10/2016 | Kumar et al. |
| 9,473,388 B2 | | 10/2016 | Kumar et al. |
| 9,473,415 B2 | | 10/2016 | Kumar |
| 9,477,280 B1 | | 10/2016 | Gangwar et al. |
| 9,529,400 B1 | | 12/2016 | Kumar et al. |
| 9,535,848 B2 | | 1/2017 | Rowlands et al. |
| 9,568,970 B1 | | 2/2017 | Kaushal et al. |
| 9,569,579 B1 | | 2/2017 | Kumar |
| 9,571,341 B1 | | 2/2017 | Kumar et al. |
| 9,571,402 B2 | | 2/2017 | Kumar et al. |
| 9,571,420 B2 | | 2/2017 | Kumar |
| 9,590,813 B1 | | 3/2017 | Kumar et al. |
| 9,660,942 B2 | | 5/2017 | Kumar |
| 9,699,079 B2 | | 7/2017 | Chopra et al. |
| 9,742,630 B2 | | 8/2017 | Philip et al. |
| 2002/0071392 A1 | | 6/2002 | Grover et al. |
| 2002/0073380 A1 | | 6/2002 | Cooke et al. |
| 2002/0083159 A1 | | 6/2002 | Ward et al. |
| 2002/0095430 A1 | | 7/2002 | Egilsson et al. |
| 2002/0150094 A1 | | 10/2002 | Cheng et al. |
| 2003/0005149 A1 | | 1/2003 | Haas et al. |
| 2003/0065897 A1 | * | 4/2003 | Sadowsky ........... G06F 12/0215 711/165 |
| 2003/0088602 A1 | | 5/2003 | Dutta et al. |

(56) References Cited

U.S. PATENT DOCUMENTS

| | | |
|---|---|---|
| 2003/0145314 A1 | 7/2003 | Nguyen et al. |
| 2003/0200315 A1 | 10/2003 | Goldenberg et al. |
| 2003/0227932 A1* | 12/2003 | Meempat ............ H04L 49/101 370/415 |
| 2004/0006584 A1 | 1/2004 | Vandeweerd |
| 2004/0019814 A1 | 1/2004 | Pappalardo et al. |
| 2004/0049565 A1 | 3/2004 | Keller et al. |
| 2004/0083326 A1* | 4/2004 | Wang ................ G06F 13/364 710/317 |
| 2004/0103218 A1 | 5/2004 | Blumrich et al. |
| 2004/0156376 A1 | 8/2004 | Nakagawa |
| 2004/0156383 A1 | 8/2004 | Nakagawa et al. |
| 2004/0216072 A1 | 10/2004 | Alpert et al. |
| 2005/0108711 A1* | 5/2005 | Arnold ............... G06F 9/3009 718/100 |
| 2005/0147081 A1 | 7/2005 | Acharya et al. |
| 2005/0152352 A1* | 7/2005 | Jun ..................... H04L 47/527 370/388 |
| 2005/0203988 A1 | 9/2005 | Nollet et al. |
| 2005/0228930 A1 | 10/2005 | Ning et al. |
| 2005/0286543 A1 | 12/2005 | Coppola et al. |
| 2006/0002303 A1 | 1/2006 | Bejerano et al. |
| 2006/0031615 A1 | 2/2006 | Bruce et al. |
| 2006/0053312 A1 | 3/2006 | Jones et al. |
| 2006/0075169 A1 | 4/2006 | Harris et al. |
| 2006/0104274 A1 | 5/2006 | Caviglia et al. |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0221948 A1* | 10/2006 | Benner ................ H04L 47/39 370/389 |
| 2006/0268909 A1 | 11/2006 | Langevin et al. |
| 2006/0271715 A1* | 11/2006 | Harris ............... G06F 13/4027 710/110 |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0189283 A1 | 8/2007 | Agarwal et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert |
| 2008/0126569 A1 | 5/2008 | Rhim et al. |
| 2008/0127014 A1 | 5/2008 | Pandey et al. |
| 2008/0184259 A1 | 7/2008 | Lesartre et al. |
| 2008/0186998 A1* | 8/2008 | Rijpkema ............ H04L 47/39 370/458 |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0067331 A1 | 3/2009 | Watsen et al. |
| 2009/0067348 A1 | 3/2009 | Vasseur et al. |
| 2009/0070726 A1 | 3/2009 | Mehrotra et al. |
| 2009/0083263 A1 | 3/2009 | Felch et al. |
| 2009/0089725 A1 | 4/2009 | Khan |
| 2009/0109996 A1 | 4/2009 | Hoover et al. |
| 2009/0122703 A1 | 5/2009 | Gangwal et al. |
| 2009/0125574 A1 | 5/2009 | Mejdrich et al. |
| 2009/0125703 A1 | 5/2009 | Mejdrich et al. |
| 2009/0125706 A1 | 5/2009 | Hoover et al. |
| 2009/0135739 A1 | 5/2009 | Hoover et al. |
| 2009/0138567 A1 | 5/2009 | Hoover et al. |
| 2009/0150647 A1 | 6/2009 | Mejdrich et al. |
| 2009/0157976 A1 | 6/2009 | Comparan et al. |
| 2009/0172304 A1 | 7/2009 | Gueron et al. |
| 2009/0182944 A1 | 7/2009 | Comparan et al. |
| 2009/0182954 A1 | 7/2009 | Mejdrich et al. |
| 2009/0182986 A1 | 7/2009 | Schwinn et al. |
| 2009/0182987 A1 | 7/2009 | Mejdrich et al. |
| 2009/0187716 A1 | 7/2009 | Comparan et al. |
| 2009/0187734 A1 | 7/2009 | Mejdrich et al. |
| 2009/0187756 A1 | 7/2009 | Nollet et al. |
| 2009/0201302 A1 | 8/2009 | Hoover et al. |
| 2009/0210184 A1 | 8/2009 | Medardoni et al. |
| 2009/0210883 A1 | 8/2009 | Hoover et al. |
| 2009/0228681 A1 | 9/2009 | Mejdrich et al. |
| 2009/0228682 A1 | 9/2009 | Mejdrich et al. |
| 2009/0228689 A1 | 9/2009 | Muff et al. |
| 2009/0228690 A1 | 9/2009 | Muff et al. |
| 2009/0231348 A1 | 9/2009 | Mejdrich et al. |
| 2009/0231349 A1 | 9/2009 | Mejdrich et al. |
| 2009/0240920 A1 | 9/2009 | Muff et al. |
| 2009/0245257 A1 | 10/2009 | Comparan et al. |
| 2009/0256836 A1 | 10/2009 | Fowler et al. |
| 2009/0260013 A1 | 10/2009 | Heil et al. |
| 2009/0268677 A1 | 10/2009 | Chou et al. |
| 2009/0271172 A1 | 10/2009 | Mejdrich et al. |
| 2009/0276572 A1 | 11/2009 | Heil et al. |
| 2009/0282139 A1 | 11/2009 | Mejdrich et al. |
| 2009/0282197 A1 | 11/2009 | Comparan et al. |
| 2009/0282211 A1 | 11/2009 | Hoover et al. |
| 2009/0282214 A1 | 11/2009 | Kuesel et al. |
| 2009/0282221 A1 | 11/2009 | Heil et al. |
| 2009/0282222 A1 | 11/2009 | Hoover et al. |
| 2009/0282226 A1 | 11/2009 | Hoover et al. |
| 2009/0282227 A1 | 11/2009 | Hoover et al. |
| 2009/0282419 A1 | 11/2009 | Mejdrich et al. |
| 2009/0285222 A1 | 11/2009 | Hoover et al. |
| 2009/0287885 A1 | 11/2009 | Kriegel et al. |
| 2009/0292907 A1 | 11/2009 | Schwinn et al. |
| 2009/0293061 A1 | 11/2009 | Schwinn et al. |
| 2009/0300292 A1 | 12/2009 | Fang et al. |
| 2009/0300335 A1 | 12/2009 | Muff et al. |
| 2009/0307714 A1 | 12/2009 | Hoover et al. |
| 2009/0313592 A1 | 12/2009 | Murali et al. |
| 2009/0315908 A1 | 12/2009 | Comparan et al. |
| 2010/0023568 A1 | 1/2010 | Hickey et al. |
| 2010/0031009 A1 | 2/2010 | Muff et al. |
| 2010/0040162 A1 | 2/2010 | Suehiro |
| 2010/0042812 A1 | 2/2010 | Hickey et al. |
| 2010/0042813 A1 | 2/2010 | Hickey et al. |
| 2010/0070714 A1 | 3/2010 | Hoover et al. |
| 2010/0091787 A1 | 4/2010 | Muff et al. |
| 2010/0100707 A1 | 4/2010 | Mejdrich et al. |
| 2010/0100712 A1 | 4/2010 | Mejdrich et al. |
| 2010/0100770 A1 | 4/2010 | Mejdrich et al. |
| 2010/0100934 A1 | 4/2010 | Mejdrich et al. |
| 2010/0106940 A1 | 4/2010 | Muff et al. |
| 2010/0125722 A1 | 5/2010 | Hickey et al. |
| 2010/0158005 A1 | 6/2010 | Mukhopadhyay et al. |
| 2010/0162019 A1 | 6/2010 | Kumar et al. |
| 2010/0189111 A1 | 7/2010 | Muff et al. |
| 2010/0191940 A1 | 7/2010 | Mejdrich et al. |
| 2010/0211718 A1 | 8/2010 | Gratz et al. |
| 2010/0223505 A1 | 9/2010 | Andreev et al. |
| 2010/0228781 A1 | 9/2010 | Fowler et al. |
| 2010/0239185 A1 | 9/2010 | Fowler et al. |
| 2010/0239186 A1 | 9/2010 | Fowler et al. |
| 2010/0242003 A1 | 9/2010 | Kwok |
| 2010/0269123 A1 | 10/2010 | Mejdrich et al. |
| 2010/0284309 A1 | 11/2010 | Allan et al. |
| 2010/0333099 A1 | 12/2010 | Kupferschmidt et al. |
| 2011/0022754 A1* | 1/2011 | Cidon ................ G06F 15/7825 710/107 |
| 2011/0035523 A1 | 2/2011 | Feero et al. |
| 2011/0044336 A1 | 2/2011 | Umeshima |
| 2011/0060831 A1 | 3/2011 | Ishii et al. |
| 2011/0063285 A1 | 3/2011 | Hoover et al. |
| 2011/0064077 A1 | 3/2011 | Wen |
| 2011/0072407 A1 | 3/2011 | Keinert et al. |
| 2011/0085550 A1 | 4/2011 | Lecler et al. |
| 2011/0085561 A1 | 4/2011 | Ahn et al. |
| 2011/0103799 A1 | 5/2011 | Shacham et al. |
| 2011/0119322 A1 | 5/2011 | Li et al. |
| 2011/0154282 A1 | 6/2011 | Chang et al. |
| 2011/0173258 A1 | 7/2011 | Arimilli et al. |
| 2011/0191088 A1 | 8/2011 | Hsu et al. |
| 2011/0191774 A1 | 8/2011 | Hsu et al. |

(56) References Cited

U.S. PATENT DOCUMENTS

| | | |
|---|---|---|
| 2011/0235531 A1 | 9/2011 | Vangal et al. |
| 2011/0243147 A1 | 10/2011 | Paul |
| 2011/0276937 A1 | 11/2011 | Waller |
| 2011/0289485 A1 | 11/2011 | Mejdrich et al. |
| 2011/0292063 A1 | 12/2011 | Mejdrich et al. |
| 2011/0302345 A1 | 12/2011 | Boucard et al. |
| 2011/0302450 A1 | 12/2011 | Hickey et al. |
| 2011/0307734 A1 | 12/2011 | Boesen et al. |
| 2011/0316864 A1 | 12/2011 | Mejdrich et al. |
| 2011/0320719 A1 | 12/2011 | Mejdrich et al. |
| 2011/0320724 A1 | 12/2011 | Mejdrich et al. |
| 2011/0320771 A1 | 12/2011 | Mejdrich et al. |
| 2011/0320854 A1 | 12/2011 | Elrabaa |
| 2011/0320991 A1 | 12/2011 | Hsu et al. |
| 2011/0321057 A1 | 12/2011 | Mejdrich et al. |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0054511 A1 | 3/2012 | Brinks et al. |
| 2012/0072635 A1 | 3/2012 | Yoshida et al. |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0144065 A1 | 6/2012 | Parker et al. |
| 2012/0155250 A1 | 6/2012 | Carney et al. |
| 2012/0173846 A1 | 7/2012 | Wang et al. |
| 2012/0176364 A1 | 7/2012 | Schardt et al. |
| 2012/0195321 A1 | 8/2012 | Ramanujam et al. |
| 2012/0198408 A1 | 8/2012 | Chopra |
| 2012/0209944 A1 | 8/2012 | Mejdrich et al. |
| 2012/0218998 A1 | 8/2012 | Sarikaya |
| 2012/0221711 A1 | 8/2012 | Kuesel et al. |
| 2012/0260252 A1 | 10/2012 | Kuesel et al. |
| 2012/0311512 A1 | 12/2012 | Michel et al. |
| 2013/0021896 A1 | 1/2013 | Pu et al. |
| 2013/0028083 A1 | 1/2013 | Yoshida et al. |
| 2013/0028090 A1 | 1/2013 | Yamaguchi et al. |
| 2013/0028261 A1 | 1/2013 | Lee |
| 2013/0036296 A1 | 2/2013 | Hickey et al. |
| 2013/0044117 A1 | 2/2013 | Mejdrich et al. |
| 2013/0046518 A1 | 2/2013 | Mejdrich et al. |
| 2013/0051397 A1 | 2/2013 | Guo et al. |
| 2013/0054811 A1 | 2/2013 | Harrand |
| 2013/0054856 A1* | 2/2013 | Lim ............... G06F 13/14 710/242 |
| 2013/0073771 A1 | 3/2013 | Hanyu et al. |
| 2013/0073878 A1 | 3/2013 | Jayasimha et al. |
| 2013/0080073 A1 | 3/2013 | de Corral |
| 2013/0080671 A1 | 3/2013 | Ishii et al. |
| 2013/0086399 A1 | 4/2013 | Tychon et al. |
| 2013/0103369 A1 | 4/2013 | Huynh et al. |
| 2013/0103912 A1 | 4/2013 | Jones et al. |
| 2013/0111190 A1 | 5/2013 | Muff et al. |
| 2013/0111242 A1 | 5/2013 | Heller et al. |
| 2013/0117543 A1 | 5/2013 | Venkataramanan et al. |
| 2013/0138925 A1 | 5/2013 | Hickey et al. |
| 2013/0145128 A1 | 6/2013 | Schardt et al. |
| 2013/0148506 A1 | 6/2013 | Lea |
| 2013/0151215 A1 | 6/2013 | Mustapha |
| 2013/0159668 A1 | 6/2013 | Muff et al. |
| 2013/0159669 A1 | 6/2013 | Comparan et al. |
| 2013/0159674 A1 | 6/2013 | Muff et al. |
| 2013/0159675 A1 | 6/2013 | Muff et al. |
| 2013/0159676 A1 | 6/2013 | Muff et al. |
| 2013/0159944 A1 | 6/2013 | Uno et al. |
| 2013/0160026 A1 | 6/2013 | Kuesel et al. |
| 2013/0160114 A1 | 6/2013 | Greenwood et al. |
| 2013/0163615 A1 | 6/2013 | Mangano et al. |
| 2013/0170506 A1* | 7/2013 | Boucard ............ G06F 15/7825 370/475 |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0185542 A1 | 7/2013 | Mejdrich et al. |
| 2013/0191572 A1 | 7/2013 | Mooney et al. |
| 2013/0191600 A1 | 7/2013 | Kuesel et al. |
| 2013/0191649 A1 | 7/2013 | Muff et al. |
| 2013/0191651 A1 | 7/2013 | Muff et al. |
| 2013/0191824 A1 | 7/2013 | Muff et al. |
| 2013/0191825 A1 | 7/2013 | Muff et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0294458 A1 | 11/2013 | Yamaguchi et al. |
| 2013/0304991 A1* | 11/2013 | Bottcher ............ G06F 12/0864 711/122 |
| 2013/0305207 A1 | 11/2013 | Hsieh et al. |
| 2013/0311819 A1 | 11/2013 | Ishii et al. |
| 2013/0326458 A1 | 12/2013 | Kazda et al. |
| 2014/0013293 A1 | 1/2014 | Hsu et al. |
| 2014/0068132 A1 | 3/2014 | Philip et al. |
| 2014/0068134 A1 | 3/2014 | Philip et al. |
| 2014/0082237 A1 | 3/2014 | Wertheimer et al. |
| 2014/0086260 A1 | 3/2014 | Dai et al. |
| 2014/0092740 A1 | 4/2014 | Wang et al. |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0126572 A1 | 5/2014 | Hutton et al. |
| 2014/0143557 A1 | 5/2014 | Kuesel et al. |
| 2014/0143558 A1 | 5/2014 | Kuesel et al. |
| 2014/0149720 A1 | 5/2014 | Muff et al. |
| 2014/0164465 A1 | 6/2014 | Muff et al. |
| 2014/0164704 A1 | 6/2014 | Kuesel et al. |
| 2014/0164732 A1 | 6/2014 | Muff et al. |
| 2014/0164734 A1 | 6/2014 | Muff et al. |
| 2014/0211622 A1 | 7/2014 | Kumar et al. |
| 2014/0229709 A1 | 8/2014 | Kuesel et al. |
| 2014/0229712 A1 | 8/2014 | Muff et al. |
| 2014/0229713 A1 | 8/2014 | Muff et al. |
| 2014/0229714 A1 | 8/2014 | Muff et al. |
| 2014/0229720 A1 | 8/2014 | Hickey et al. |
| 2014/0230077 A1 | 8/2014 | Muff et al. |
| 2014/0232188 A1 | 8/2014 | Cheriyan et al. |
| 2014/0241376 A1 | 8/2014 | Balkan et al. |
| 2014/0254388 A1 | 9/2014 | Kumar et al. |
| 2014/0281243 A1 | 9/2014 | Shalf et al. |
| 2014/0281402 A1 | 9/2014 | Comparan et al. |
| 2014/0307590 A1 | 10/2014 | Dobbelaere et al. |
| 2014/0344485 A1* | 11/2014 | Dondini ............ G06F 13/28 710/22 |
| 2014/0359641 A1 | 12/2014 | Clark et al. |
| 2014/0376569 A1 | 12/2014 | Philip et al. |
| 2015/0020078 A1 | 1/2015 | Kuesel et al. |
| 2015/0026435 A1 | 1/2015 | Muff et al. |
| 2015/0026494 A1 | 1/2015 | Bainbridge et al. |
| 2015/0026500 A1 | 1/2015 | Muff et al. |
| 2015/0032988 A1 | 1/2015 | Muff et al. |
| 2015/0032999 A1 | 1/2015 | Muff et al. |
| 2015/0043575 A1 | 2/2015 | Kumar et al. |
| 2015/0081941 A1 | 3/2015 | Brown et al. |
| 2015/0103822 A1 | 4/2015 | Gianchandani et al. |
| 2015/0109024 A1 | 4/2015 | Abdelfattah et al. |
| 2015/0159330 A1 | 6/2015 | Weisman et al. |
| 2015/0160716 A1* | 6/2015 | Hiraoka ............ G06F 1/3253 713/320 |
| 2015/0178435 A1 | 6/2015 | Kumar |
| 2015/0293709 A1* | 10/2015 | Quach ............ G06F 13/1668 711/105 |
| 2015/0331831 A1 | 11/2015 | Solihin |
| 2015/0348600 A1 | 12/2015 | Bhatia et al. |
| 2015/0381707 A1 | 12/2015 | How |
| 2017/0061053 A1 | 3/2017 | Kumar et al. |
| 2017/0063625 A1 | 3/2017 | Philip et al. |
| 2017/0063697 A1 | 3/2017 | Kumar |
| 2018/0173649 A1* | 6/2018 | Kyrychynskyi ...... G06F 13/161 |
| 2018/0181329 A1* | 6/2018 | Bhati ............... G06F 9/3824 |

(56) References Cited

U.S. PATENT DOCUMENTS

| | | | |
|---|---|---|---|
| 2018/0232316 A1* | 8/2018 | Mirza | G06F 12/1009 |
| 2018/0285261 A1* | 10/2018 | Mandal | G06F 3/0653 |
| 2019/0258573 A1* | 8/2019 | Rowlands | G06F 12/0811 |

FOREIGN PATENT DOCUMENTS

| | | |
|---|---|---|
| JP | 6060316 B2 | 1/2017 |
| JP | 6093867 B2 | 2/2017 |
| KR | 10-2013-0033898 A1 | 4/2013 |
| KR | 101652490 | 8/2016 |
| KR | 101707655 | 2/2017 |
| WO | 2010074872 A1 | 7/2010 |
| WO | 2013063484 A1 | 5/2013 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, pp. 253-262.

Grot, B., Preemptive Virtual Clock: A Flexible, Efficient, and Cost-Effective QO5 Scheme for Networks-on-Chip, Micro '09, Dec. Dec. 16, 2009, 12 pgs.

Grot, B., Kilo-NOC: A Heterogeneous Network-on-Chip Architecture for Scalability and Service Guarantees, ISCA 11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Hestness, J., et al., Netrace: Dependency-Tracking for Efficient Network-on-Chip Experimentation, the University of Texas at Austin, Dept. of Computer Science, May 2011, 20 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71(5), May 2011, 14 pgs.

Lin, S., et al., Scalable Connection-Based Flow Control Scheme for Application-Specific Network-on-Chip, the Journal of China Universities of Posts and Telecommunications, Dec. 2011, 18(6), pp. 98-105.

Bolotin, Evgency, et al., "QNoC: QoS Architecture and Design Process for Network on Chip" 2004, 24 pages, Journal of Systems Architecture 50 (2004) 105-128 Elsevier.

Holsmark, Shashi Kumar Rickard, et al., "HiRA: A Methodology for Deadlock Free Routing in Hierarchical Networks on Chip", 10 pages, (978-1-4244-4143-3/09 2009 IEEE).

Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.

Rajesh BV, Shivaputra, "NoC: Design and Implementation of Hardware Network Interface With Improved Communication Reliability", 7 pages, International Journal of VLSI and Embedded Systems, IJIVES (vol. 04, Article 06116; Jun. 2013).

Yang, J., et al., Homogeneous NoC-based FPGA: The Foundation for Virtual FPGA, 10th IEEE International Conference on Computer and Information Technology (CIT 2010), Jun. 2010, pp. 62-67.

Zaman, Aanam, "Formal Verification of Circuit-Switched Network on Chip (NoC) Architectures using Spin", Oosman Hasan, IEEE © 2014, 8 pages.

Benini, Luca, et al., "Networks on Chips: A New SoC Paradigm", IEEE Computers, SOC Designs, pp. 70-78, Copyright 2002 IEEE. 0018-9162/02.

Sethuraman, Ranga Vemuri Balasubramanian, "optiMap: A Tool for Automated Generation of NoC Architecture Using Multi-Port Routers for FPGAs", IEEE, pp. 1-6, 2006.

International Search Report and Written Opinion for PCT/US2014/060745, dated Jan. 21, 2015, 10 pgs.

International Search Report and Written Opinion for PCT/US2014/060879, dated Jan. 21, 2015, 10 pgs.

International Search Report and Written Opinion for PCT/US2014/060892, dated Jan. 27, 2015, 10 pgs.

International Search Report and Written Opinion for PCT/US2014/060886, dated Jan. 26, 2015, 10 pgs.

International Search Report and Written Opinion for PCT/US2013/064140, dated Jan. 22, 2014, 9 pgs.

International Search Report and Written Opinion for PCT/US2014/012003, dated Mar. 26, 2014, 9 pgs.

International Search Report and Written Opinion for PCT/US2014/012012, dated May 14, 2014, 9 pgs.

International Search Report and Written Opinion for PCT/US2014/023625, dated Jul. 10, 2014, 9 pgs.

International Preliminary Report on Patentability for International Application No. PCT/US2013/064140, dated Apr. 14, 2015, 5 pages.

Office Action for Korean Patent Application No. 10-2016-7019093 dated Sep. 8, 2016, 3 pages plus 1 page English translation. KIPO, Korea.

Notice of Allowance for for Korean Patent Application No. 10-2016-7019093 dated Sep. 8, 2016, 4 pages. KIPO, Korea.

International Search Report and Written Opinion for PCT/US2014/037902, dated Sep. 30, 2014, 14 pgs.

Office Action for Japanese Patent Application No. 2015-535898 dated Oct. 25, 2016, 2 pages English, 2 pages untranslated copy. Japan Patent Office.

Notice of Grant for Japanese Patent Application No. 2015-535898 dated Jan. 17, 2017, 3 pages, untranslated. Japan Patent Office.

International Search Report and Written Opinion for PCT/US2014/048190, dated Nov. 28, 2014, 11 pgs.

Office Action for Japanese Patent Application No. 2016-516030 dated Aug. 30, 2016, 2 pages, Japan Patent Office.

Decision to Grant for Japanese Patent Application No. 2016-516030 dated Nov. 22, 2016, 6 pages, untranslated, Japan Patent Office.

\* cited by examiner (RELATED ART)

(RELATED ART)

| | |
|---|---|
| 0 | 0 |
| 1 | 0 |
| 2 | 0 |
| 3 | 1 |
| 4 | 1 |
| 5 | 1 |
| 6 | 1 |
| 7 | 1 |

ENHANCED PAGE LOCALITY IN NETWORK-ON-CHIP (NOC) ARCHITECTURES

CROSS REFERENCE TO RELATED APPLICATION

This U.S. patent application is based on and claims the benefit of domestic priority under 35 U.S.C 119(e) from provisional U.S. patent application No. 62/634,100, filed on Feb. 22, 2018, the disclosure of which is hereby incorporated by reference herein in its entirety.

TECHNICAL FIELD

Methods and example implementations described herein are generally directed to memory access in Network-on-Chip (NoC) architectures, and more specifically, to reduction in access latency due to enhanced page locality in NoC architectures.

RELATED ART

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1A, 2-D (two dimensional) mesh (as shown in FIG. 1B), and 2-D Torus (as shown in FIG. 1C) are examples of topologies in the related art. Mesh and Torus can also be extended to 2.5-D (two and half dimensional) or 3-D (three dimensional) organizations. FIG. 1D shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has its ports used, one connecting to the router 112 at the top layer and another connecting to the router 110 at the bottom layer. Routers 110 and 112 are at the bottom and top mesh layers respectively and therefore have only the upper facing port 113 and the lower facing port 114 respectively connected.

Packets are message transport units for intercommunication between various components. Routing involves identifying a path that is a set of routers and physical links of the network over which packets are sent from a source to a destination. Components are connected to one or multiple ports of one or multiple routers; with each such port having a unique identification (ID). Packets can carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2A pictorially illustrates an example of XY routing in a two dimensional mesh. More specifically, FIG. 2A illustrates XY routing from node '34' to node '00'. In the example of FIG. 2A, each component is connected to only one port of one router. A packet is first routed over the X-axis till the packet reaches node '04' where the X-coordinate of the node is the same as the X-coordinate of the destination node. The packet is next routed over the Y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits).

The first flit is a header flit, which holds information about this packet's route and key message level info along with payload data and sets up the routing behavior for all subsequent flits associated with the message. Optionally, one or more body flits follows the header flit, containing remaining payload of data. The final flit is a tail flit, which, in addition to containing last payload, also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there exist multiple route paths of equal length or number of hops between any pair of source and destination nodes. For example, in FIG. 2B, in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3A illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3B, a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

System on Chips (SoCs) are becoming increasingly sophisticated, feature rich, and high performance by integrating a growing number of standard processor cores, memory and I/O subsystems, and specialized acceleration IPs. To address this complexity, NoC approach of connecting SoC components is gaining popularity. A NoC can provide connectivity to a plethora of components and interfaces and simultaneously enable rapid design closure by being automatically generated from a high level specification. The specification describes interconnect requirements of SoC in terms of connectivity, bandwidth, and latency. The specification can include constraints such as Bandwidth/Quality of Service (QoS)/latency attributes that are to be met by the NoC, and can be, in various software formats, depending on the design tools, utilized. Once NoC is generated through the use of design tools on the specification to meet specification requirements, physical architecture can be implemented either by manufacturing a chip layout to facilitate NoC or by generation of a register transfer level (RTL) for execution on a chip to emulate the generated NoC, depending on desired implementation. Specifications may be in common power format (CPF), Unified Power Format (UPF), or others according to the desired specification. Specifications can be in the form of traffic specifications indicating the traffic, bandwidth requirements, latency requirements, interconnections, etc depending on the desired implementation. Specifications can also be in the form of power specifications to define power domains, voltage domains, clock domains, and so on, depending on the desired implementation.

Specification can include parameters for bandwidth, traffic, jitter, dependency information, and attribute information depending on desired implementation. In addition to this, information such as position of various components, protocol information, clocking and power domains, etc. may be supplied. A NoC compiler can then use this specification to automatically design a NoC for the SoC. A number of NoC compilers were introduced in the related art that automatically synthesize a NoC to fit a traffic specification. In such design flows, synthesized NoC is simulated to evaluate performance under various operating conditions and to determine whether the specifications are met. This may be necessary because NoC-style interconnects are distributed systems and their dynamic performance characteristics under load are difficult to predict statically and can be very sensitive to a wide variety of parameters.

One of the key resources in any SOC is the memory bandwidth, wherein available bandwidth is traffic dependent. For a DRAM/memory controller to achieve high bandwidth, it must avoid impediments that arise from switching pages or switching between reads and writes. These impediments/stalls create absolute bandwidth loss in the system, and most memory controllers in real system fall far short of their theoretical bandwidth (something like 65-75% efficiency). To avoid these stalls and achieve higher bandwidth, memory controllers must be able to take advantage of page locality.

Page locality is a kind of spatial locality, wherein when a DRAM page is opened, further accesses to that page are low latency and require no overhead. Since the page is defined by an address range, requests within that address range will have page locality. Therefore, request streams with good spatial locality have the potential to have good page locality. Page locality has a temporal component. For a page hit to occur, requests within the same spatial block of physical memory (often 4 KB or 8 KB) must arrive at the memory controller and be processed before the page is closed.

There is therefore a need for methods, systems, and computer readable mediums for overcoming the above-mentioned issues with existing implementations of memory access so as to increase efficiency of memory controllers and reduce overall memory access latency.

SUMMARY

Methods and example implementations described herein are generally directed to quality-of-service (QOS) enhancement pertaining to packet routing in Network-on-Chip (NoC) architectures, and more specifically, to implementation of a bandwidth weighting mechanism based NoC configuration/constructions for packet routing.

Aspects of the present disclosure relate to methods, systems, and computer readable mediums for page locality based memory access request processing in a network-on-chip (NoC) architecture. In an aspect, method of the present disclosure comprises determining, at an arbitrator, while selecting a NoC agent from a plurality of NoC agents for request processing for a forthcoming round, if current NoC agent of current round is processing a packet stream and if said packet stream is completely processed at the end of said current round, wherein processing of the packet stream enables cluster requests to be processed at same part of said memory and enhances page locality; and re-selecting, at said arbitrator, said current NoC agent as the NoC agent for the forthcoming round if said packet stream processing is not completed at the end of said current round, so as to enable said current NoC agent to complete processing of said packet stream in said forthcoming round.

In an aspect, if said packet stream processing is completed, said arbitrator selects the NoC agent having the next highest priority for the forthcoming round, and said current NoC agent is allocated lowest priority.

In another aspect, said arbitrator is a round-robin based packet processing arbitrator.

In an aspect, the arbitrator selects the NoC agent so as to enhance page locality without compromising on unfairness to said plurality of NoC agents beyond a defined threshold.

In an example implementation, the step of determining whether said packet stream is completely processed is performed based on a stream indicator that forms part of said packet stream, such that said current NoC agent is selected in each forthcoming round till end of packet stream indicator is received. In another example implementation, the step of determining whether said packet stream is completely processed is performed based on destination address mentioned in each packet of said packet stream such that said current NoC agent is selected in each forthcoming round till the same destination address is mentioned in each packet of said packet stream. In yet another example implementation, the step of determining whether said packet stream is completely processed is performed based on an intimation from said current NoC agent that it is a part of said packet stream. In another example implementation, the step of determining whether said packet stream is completely processed is done by a master bridge by analyzing address stream that forms part of said packet stream. In yet another example implementation, the step of determining whether said packet stream is completely processed is done based on receipt of new stream information, said new stream information being shared with each output port of router associated with said arbitrator.

In an aspect, the present disclosure relates to a system for page locality based memory access request processing in a network-on-chip (NoC) architecture, said system comprising: an current agent packet stream processing status determination module configured to determine, at an arbitrator, while selecting a NoC agent from a plurality of NoC agents for request processing for a forthcoming round, if current NoC agent of current round is processing a packet stream and if said packet stream is completely processed at the end of said current round, wherein processing of the packet stream enables cluster requests to be processed at same part of said memory and enhances page locality; and a packet stream processing status based agent selection module configured to re-select, at said arbitrator, said current NoC agent as the NoC agent for the forthcoming round if said packet stream processing is not completed at the end of said current round, so as to enable said current NoC agent to complete processing of said packet stream in said forthcoming round.

In another aspect, the present disclosure further relates to a non-transitory computer readable storage medium storing instructions for executing a process, the instructions comprising: determining, at an arbitrator, while selecting a NoC agent from a plurality of NoC agents for request processing for a forthcoming round, if current NoC agent of current round is processing a packet stream and if said packet stream is completely processed at the end of said current round, wherein processing of the packet stream enables cluster requests to be processed at same part of said memory and enhances page locality; and re-selecting, at said arbitrator, said current NoC agent as the NoC agent for the forthcoming round if said packet stream processing is not completed at the end of said current round, so as to enable said current NoC agent to complete processing of said packet stream in said forthcoming round.

DETAILED DESCRIPTION

Figure 1A:
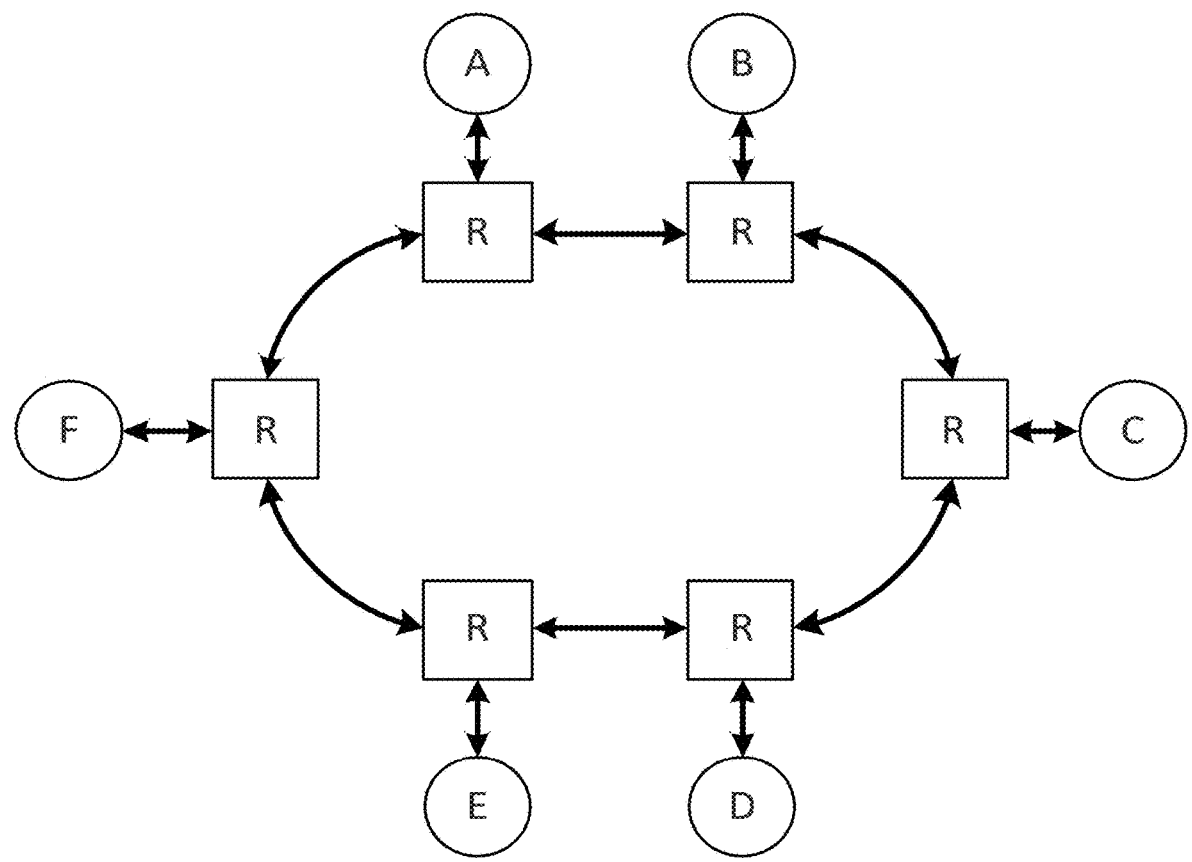
FIGS. 1A, 1B, 1C, and 1D illustrate examples of Bidirectional ring, 2D Mesh, 2D Torus, and 3D Mesh NoC Topologies.
Figure 1B:
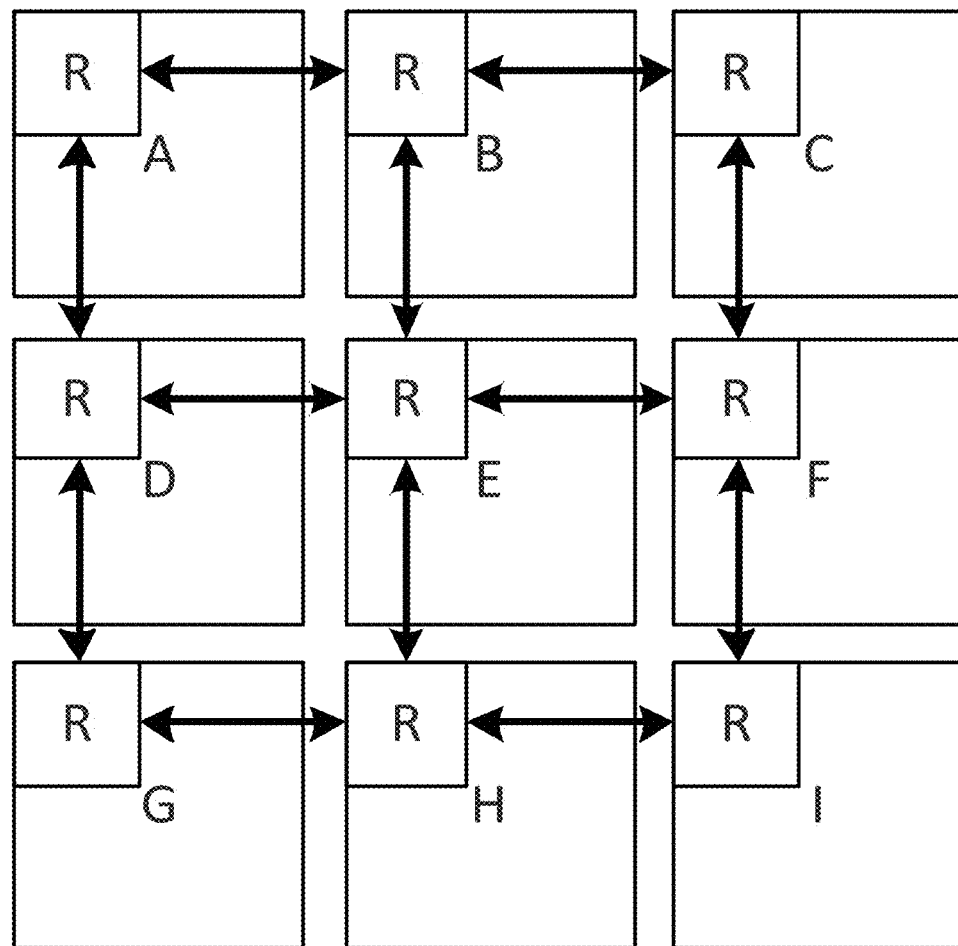
Figure 1C:
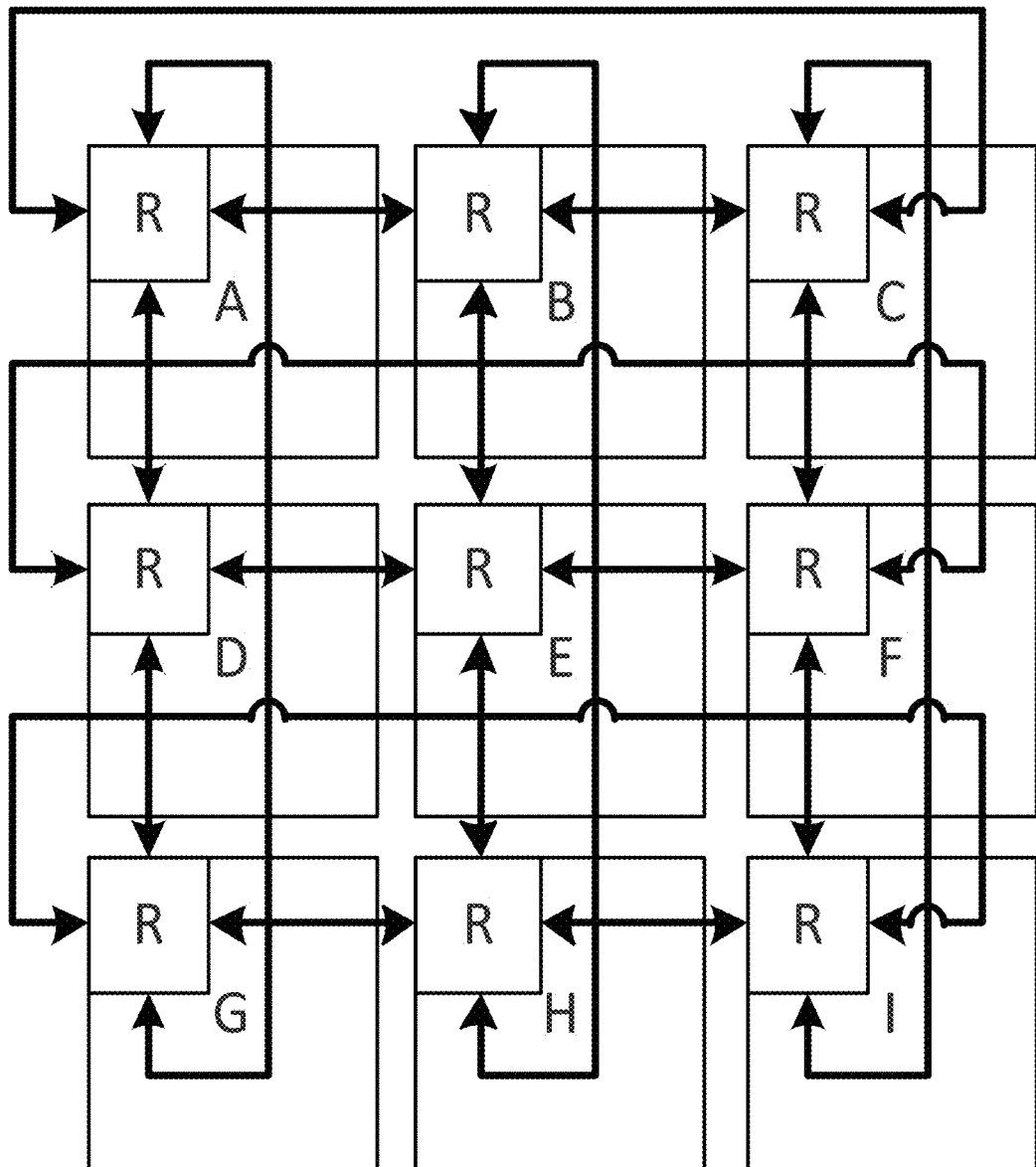
Figure 1D:
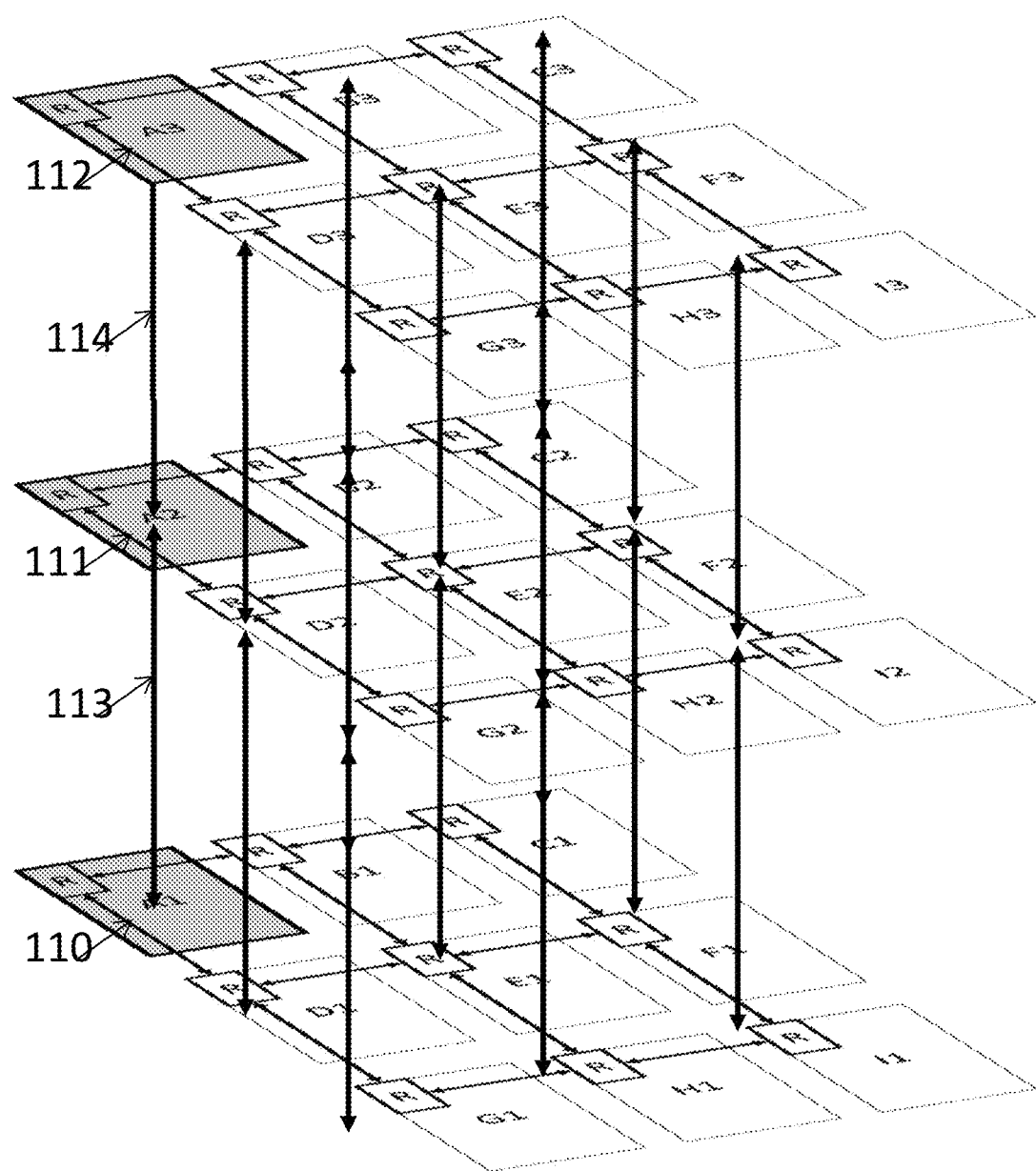
Figure 2A:
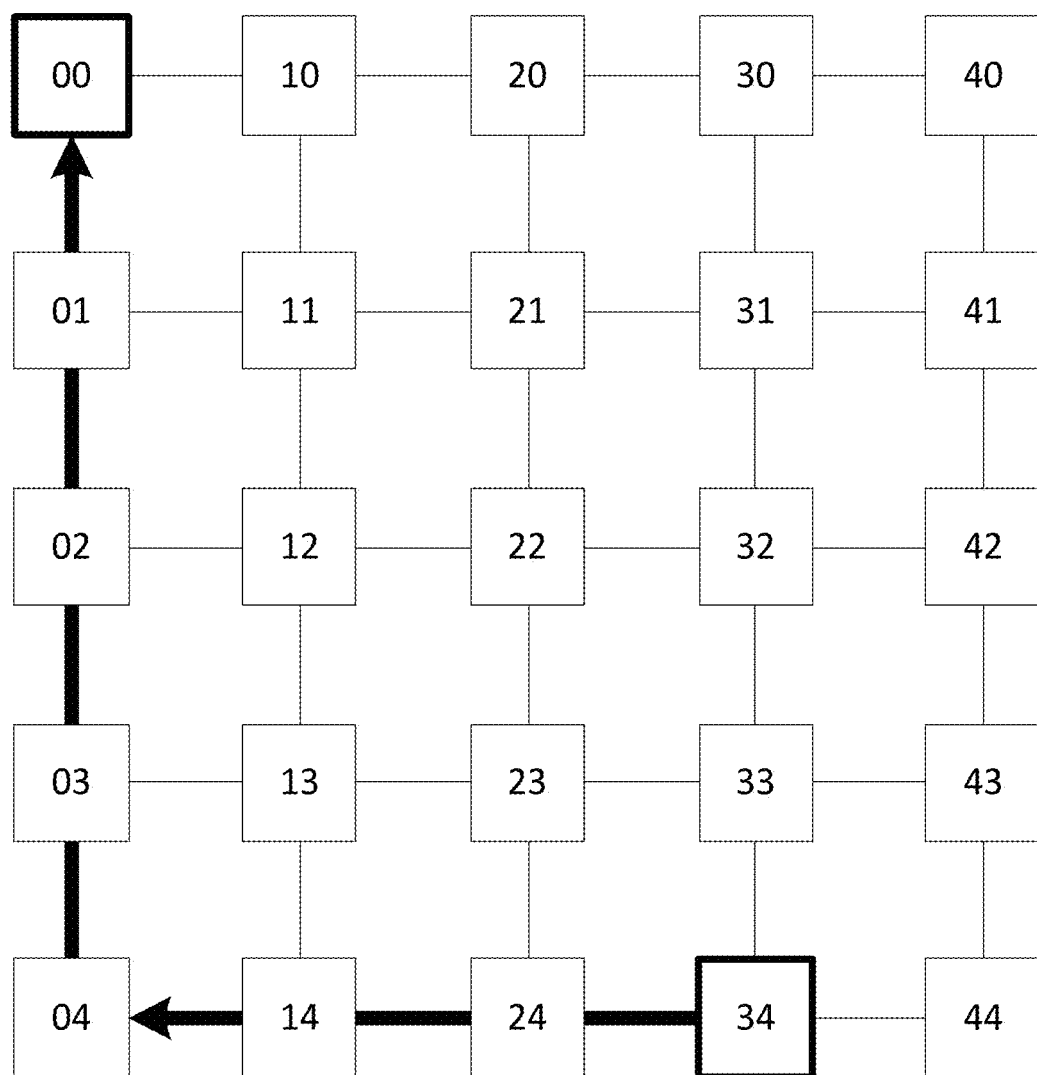
FIG. 2A illustrates an example of XY routing in a related art two dimensional mesh.
Figure 2B:
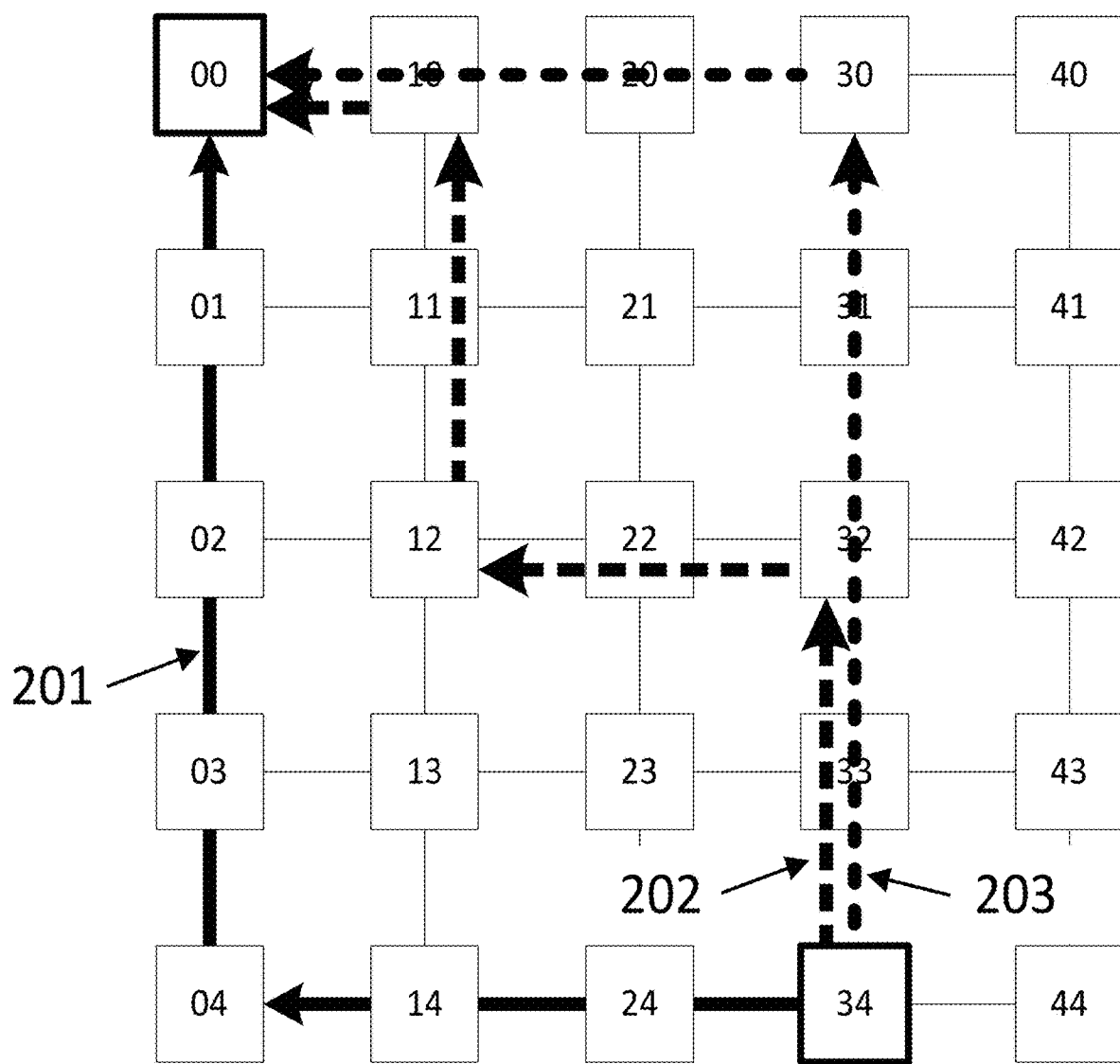
FIG. 2B illustrates three different routes between a source and destination nodes.
Figure 3A:
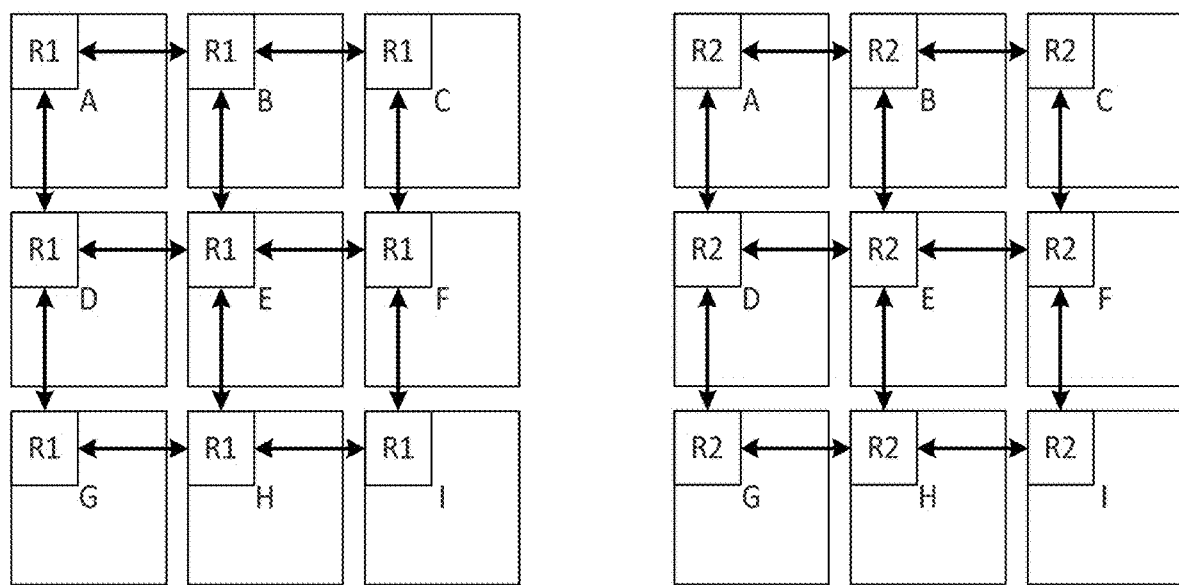
FIG. 3A illustrates an example of a related art two layer NoC interconnect.
Figure 3B:
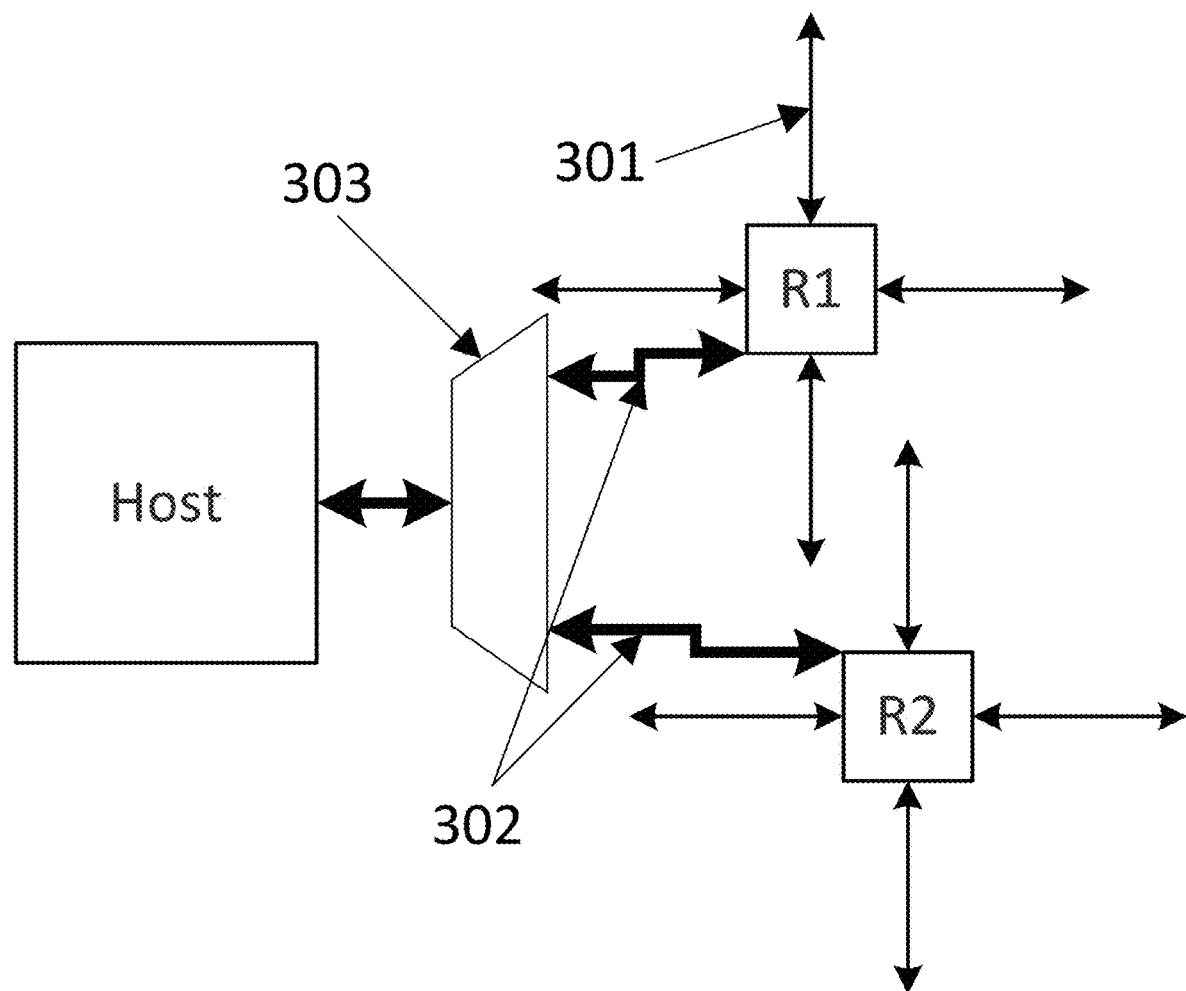
FIG. 3B illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Network-on-Chip (NoC) has emerged as a paradigm to interconnect a large number of components on the chip. NoC is a global shared communication infrastructure made up of several routing nodes interconnected with each other using point-to-point physical links. In example implementations, a NoC interconnect is generated from a specification by utilizing design tools. The specification can include constraints such as bandwidth/Quality of Service (QoS)/latency attributes that is to be met by the NoC, and can be in various software formats depending on the design tools utilized. Once the NoC is generated through the use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation. Specifications may be in common power format (CPF), Unified Power Format (UPF), or others according to the desired specification. Specifications can be in the form of traffic specifications indicating the traffic, bandwidth requirements, latency requirements, interconnections, etc. depending on the desired implementation. Specifications can also be in the form of power specifications to define power domains, voltage domains, clock domains, and so on, depending on the desired implementation.

Methods and example implementations described herein are generally directed to quality-of-service (QOS) enhancement pertaining to packet routing in Network-on-Chip (NoC) architectures, and more specifically, to implementation of a bandwidth weighting mechanism based NoC configuration/constructions for packet routing.

Aspects of the present disclosure relate to methods, systems, and computer readable mediums for page locality based memory access request processing in a network-on-chip (NoC) architecture. In an aspect, method of the present disclosure comprises determining, at an arbitrator, while selecting a NoC agent from a plurality of NoC agents for request processing for a forthcoming round, if current NoC agent of current round is processing a packet stream and if said packet stream is completely processed at the end of said current round, wherein processing of the packet stream enables cluster requests to be processed at same part of said memory and enhances page locality; and re-selecting, at said arbitrator, said current NoC agent as the NoC agent for the forthcoming round if said packet stream processing is not completed at the end of said current round, so as to enable said current NoC agent to complete processing of said packet stream in said forthcoming round.

In an aspect, if said packet stream processing is completed, said arbitrator selects the NoC agent having the next highest priority for the forthcoming round, and said current NoC agent is allocated lowest priority.

In another aspect, said arbitrator is a round-robin based packet processing arbitrator.

In an aspect, the arbitrator selects the NoC agent so as to enhance page locality without compromising on unfairness to said plurality of NoC agents beyond a defined threshold.

In an example implementation, the step of determining whether said packet stream is completely processed is performed based on a stream indicator that forms part of said packet stream, such that said current NoC agent is selected in each forthcoming round till end of packet stream indicator is received. In another example implementation, the step of determining whether said packet stream is completely processed is performed based on destination address mentioned in each packet of said packet stream such that said current NoC agent is selected in each forthcoming round till the same destination address is mentioned in each packet of said packet stream. In yet another example implementation, the step of determining whether said packet stream is completely processed is performed based on an intimation from said current NoC agent that it is a part of said packet stream. In another example implementation, the step of determining whether said packet stream is completely processed is done by a master bridge by analyzing address stream that forms part of said packet stream. In yet another example implementation, the step of determining whether said packet stream is completely processed is done based on receipt of new stream information, said new stream information being shared with each output port of router associated with said arbitrator.

In an aspect, the present disclosure relates to a system for page locality based memory access request processing in a network-on-chip (NoC) architecture, said system comprising: an current agent packet stream processing status determination module configured to determine, at an arbitrator, while selecting a NoC agent from a plurality of NoC agents for request processing for a forthcoming round, if current NoC agent of current round is processing a packet stream and if said packet stream is completely processed at the end of said current round, wherein processing of the packet stream enables cluster requests to be processed at same part of said memory and enhances page locality; and a packet stream processing status based agent selection module configured to re-select, at said arbitrator, said current NoC agent as the NoC agent for the forthcoming round if said packet stream processing is not completed at the end of said current round, so as to enable said current NoC agent to complete processing of said packet stream in said forthcoming round.

In another aspect, the present disclosure further relates to a non-transitory computer readable storage medium storing instructions for executing a process, the instructions comprising: determining, at an arbitrator, while selecting a NoC agent from a plurality of NoC agents for request processing for a forthcoming round, if current NoC agent of current round is processing a packet stream and if said packet stream is completely processed at the end of said current round, wherein processing of the packet stream enables cluster requests to be processed at same part of said memory and enhances page locality; and re-selecting, at said arbitrator, said current NoC agent as the NoC agent for the forthcoming round if said packet stream processing is not completed at the end of said current round, so as to enable said current NoC agent to complete processing of said packet stream in said forthcoming round.

In an aspect, an exemplary problem being solved by the present invention pertains to how to make arrival of requests to memory resource-efficient. Spatial locality occurs naturally in the request streams of most agents, but there is usually no spatial locality across agents, which means that the memory controller must receive multiple requests from a single agent in order to get any page locality. Consider a system with 100 agents talking to memory, where if the arbitration for these 100 agents uses round-robin technique, only 1 request from an agent every 100 requests would be observed, which would provide almost no page locality, and would substantially limit the number of requests from an agent.

The present disclosure therefore provides an arbitration mechanism that favors clustering of agent's traffic so that several requests from the same master arrive at the memory together, allowing for higher memory bandwidth. Not all traffic will have spatial locality, but any hope of improving memory bandwidth rests on utilizing the spatial locality where it does exist.

Routers and bridges that form part of a NoC have a complex arbitration mechanism, wherein they recognize priority levels, QoS weight mechanisms, catch-up and end-of-round state, and store-and-forward levels, but when the competing traffic is the same priority level, the arbitration uses a round-robin arbiter. While simple, this has an almost worst-case effect on the page locality. Therefore, in an aspect, of the present disclosure, in order to enhance page locality, a modification to the round-robin arbiter is needed. Normally when an agent wins the arbitration, it marks itself as the lowest-priority agent in the round-robin protocol. To provide stickiness to an agent (i.e. requests from the same agent be processed in the subsequent round as well in order to improve page locality), an update of the state needs to be changed.

In an aspect, the present disclosure enables an agent/source request to update its state so that is conditionally either the highest priority or the lowest priority based on one or more inputs. It should be set as the highest priority when it is continuing an existing stream, but should be set as lowest priority if it is trying to start a new stream. As would be appreciated, if an agent is sending packets pertaining to a single stream, its likelihood to access a cached memory resource such as a page would be much higher in the next round as well, which would significantly improve the page locality and reduce latency, and therefore in case, during arbitration in the next round, it is determined that the current agent is sending packets that form part of a single stream, the current agent is again selected/chosen as the active agent through arbitration in the next round as well, else said agent is associated the lowest priority.

In an instance of the present invention, if there are 128 master agents talking to memory in a NoC architecture, expectation due to spatial locality is that, for any given master agent, its requests have fairly high likelihood of hitting the same part of the memory, enabling enhanced page locality, low latency, and efficient access to next cache line. Therefore, it may be more efficient for the same master to continue sending requests in the next round as well even though in the next round, due to round-robin implementation, said master would be allocated the lowest priority in the existing techniques. Such allowance of the same master to continue being served till its stream is over, increases stickiness of the master and bring in unfairness to other master agents, but strongly enhances page locality and, as a result, low latency.

In an aspect, the present disclosure enables the arbitration to be programmable and not rigid so as to allow clustering of streaming packets to be processed in a single go and bring in more stickiness while processing requests from an agent that is processing a packet stream. In an aspect therefore, the present invention enables NoC network to cluster requests from the same master to enable efficient page locality. Alternatively, if the network/arbitrator has better information about the request stream itself, requests in the same stream that are directed to the same page can be clustered. Aspects of the present invention can further programmably modify the number of credits being allocated to each agent based on packets being processed by said agent, streams being processed by said agent, attributes of the memory controller, along with priority and characteristics of the other NoC agents.

Figures 4A, 4B:
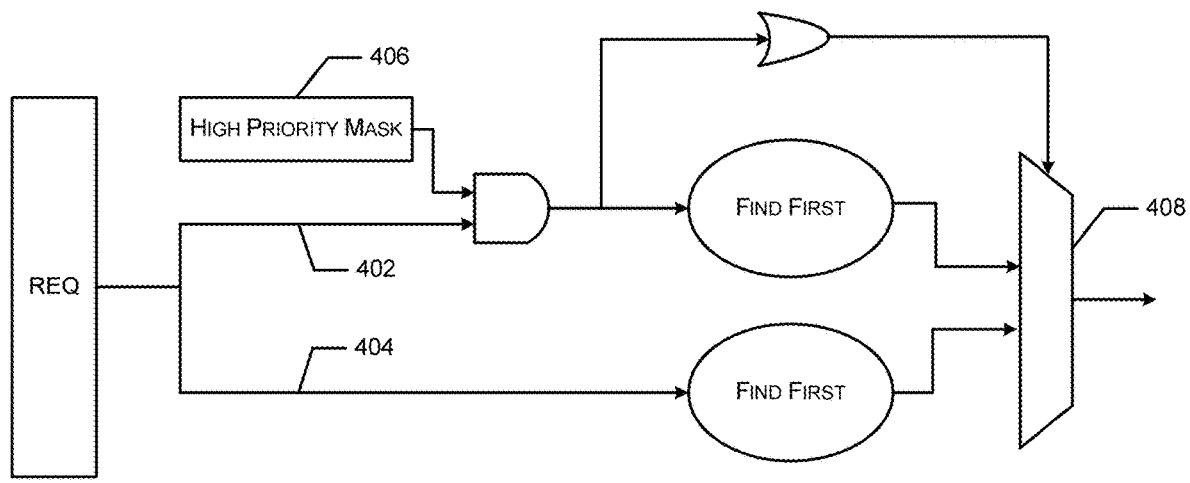
FIGS. 4A and 4B illustrate existing implementations of how determination of NoC agent for each round is current done.

FIG. 4A illustrates an existing implementation of round-robin based packet routing wherein, as shown, there are two paths 402 and 404 in existing round-robin priority mechanisms, one path 402 being for high priority requests that utilize a mask value 406 to determine which requests are high priority, and other path 404 being for low priority requests. If any high priority request is active, the output Mux 408 selects the first of the them, else it selects the first low priority request.

FIG. 4B illustrates an exemplary high priority mask where in order to support a state where a request is either highest priority or lowest priority, such a high priority mask can be incorporated.

In aspects of the present disclosure, manner in which the highest priority requests/agents are determined for agent selection in the next round can be modified so as to incorporate a factor of whether the current requests form part of the same a single stream such that in case the requests are of the same stream and are likely to access the same cached page from the memory, agent responsible for such current requests is given the highest priority for the next round as well so that same stream continues to get processed, increasing page locality.

As shown in FIG. 4B, requests from 3 to 7 are all high priority, with 3 being the highest priority. In the prior art systems, if all the requests were active, the find-first of the high priority requests would select request 3. On the other hand, the proposed architecture takes into context status of the current agent i.e. the agent that was granted last. In this case, request 2 was the last winner, because after winning an agent modifies the round-robin mask to indicate that they are the lowest priority. Lowest priority is indicated by the equation ~req[A] & req[A+1]. This information can be used to allow a request port that won last cycle to act as highest priority. In order to determine whether a request should use high or low priority, a new input, as part of the present invention, can indicate whether the request is part of a new stream or an old stream. The following equation can then be used to determine which, if any, input request should act as high priority:
assign continue_hp=req[n−1:0]&~new_stream[n−1:0] &~hp_mask[n−1:0]& hp_mask[n:1]; According to the above equation, a request port should act as high priority when it has a valid request, is the lowest priority, and it is continuing a stream. This information can therefore be factored into the round-robin mechanism as shown in FIG. 5.

Figure 5:
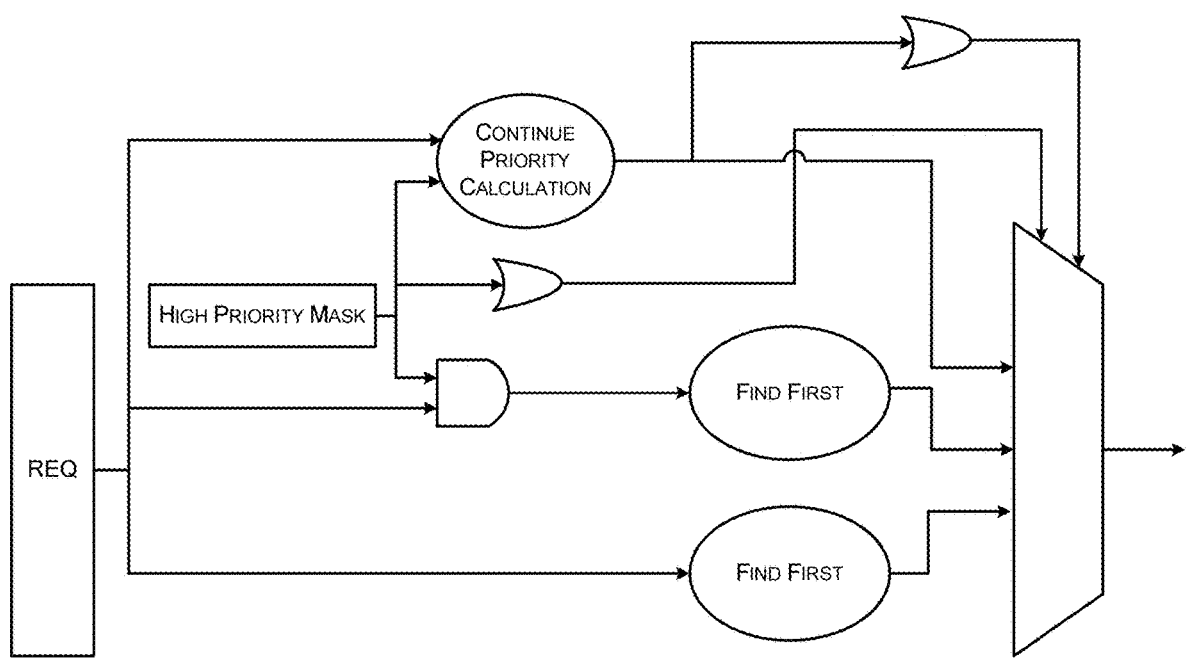
FIG. 5 illustrates an exemplary architecture showing manner in which determination of NoC agent for each round is performed in accordance in accordance with an example implementation.

FIG. 5 illustrates an architecture of the present invention in accordance with an example implementation, wherein, as shown, an evaluation/calculation can be done to generate a new vector that indicates if the lowest priority agent wants to continue with the same stream. There can only be one bit active in this vector as only one of the agents is the lowest priority. If one of the bits is active, the output mux can select that bit, instead of one of the other find-first vectors, which will make the lowest priority agent, if it is continuing the same stream, to win the arbitration which will lead to better page locality.

In an aspect, any method that can enable a network arbitrator node to detect whether the current agent is processing a stream so as to then arbitrate the next round in order to make the same agent win the next arbitration round as well is well within the scope of the present invention. There can be multiple methods of generating appropriate stream information, based on which an arbitrator node can detect if the current agent is processing a stream.

In an exemplary implementation, aspects of the present invention, in order to enhance page locality, can add a small counter (one per input VC) in each arbiter. When an input VC first wins the arbitration, it could be marked as the start of a new stream and a counter can be reset. If new requests from the same input VC arrive, they will be recognized as part of the same stream and win the arbitration through the new arbitration mechanism. Each granted request would increment the counter such that when the counter reaches a predefined count, the next request will act as a new stream.

In an exemplary aspect, the counter can only be increments on an End-of-Packet (EOP), as it is counting full requests. The counter can be parameterized or programmable, and can interchangeably be referred to as a stickiness counter.

In another exemplary implementation, the page locality can be significantly improved if page locality was propagated though the network from the source bridges, wherein instead of a counter in the router arbiters, the counter can exist in each TX bridge, such that the bridge would then pass a signal to the target routers to indicate a new stream, or a continuation of the old stream. This allows each bridge to use a different policy. Some agents would want stickiness. Others would want less or none at all. Each could be independently defined or programmed. With this information sent with the packet, the routers would be in better shape to recognize the real starting and ending of streams to maximize page locality. In an aspect, this approach can be implemented as an upper bound for stream length. For designs without any other indicator of stream length, this would determine where a new stream starts. For bridges with a concept of a stream, this could specify the upper bound of a stream length to prevent too much unfairness within the bandwidth sharing round.

In yet another implementation, instead of having a bridge use a counter to heuristically determine stream boundaries, AXI (Advanced eXtensible Interface) bridges could do a better job by actually looking at the request stream itself. If a large request (say 4 KB) is split into smaller requests (say 64B), it would be easy for the bridge to indicate that the request is part of a single stream and has good page-locality.

In another implementation, a more general-purpose approach would be for the bridge to look at the address of consecutive requests, whether they are from a split request or independent requests. If the address is in the same 4 KB page boundary, the bridge could determine that locality exists and mark the stream information appropriately. In an aspect, this can be implemented in all address-based bridge designs.

In another implementation, while source bridge could use a counter, some agents may have better information about whether a request is part of a stream or not. This is particularly true in the NSIP interface where page locality cannot be gleaned from the packet itself. But the agent itself may be able to pass this information with the packet stream, when it makes sense. If the new stream bit was added as an optional interface addition, the user could control locality directly. This can be an optional input to the NSIP bridge.

In an aspect relating to how new stream information can be passed along, in one exemplary implementation, the new stream information can be sent as an additional sideband bit, and can only be asserted on the Start-of-Packet (SOP) of a packet. Any additional flits for that packet can be marked as a continuation of the stream.

In another exemplary implementation, router can replicate this new stream information such that when a new stream bit arrives at an input VC, it should remember this for each possible output VC. When the first packet is sent from this input VC to an output VC, that packet should be marked as a new stream.

In an aspect, in one scenario when packets are coming on multiple input VCs going to the same output VC, page locality enhancement may attempt to stick with the same input VC until the stream has ended. However, if there are bubbles in the requests, it may switch early, and therefore the question is whether when it switches, the granted packet should be marked as a new stream or not. It is to be appreciated that it is a different stream since it is coming from a different input. Imagine a scenario with two stream, marked A and B. If bubbles created an interleaved traffic stream, we would see: A0, B0, A1, B1, A2, B2, A3, B3 . . ., in such a situation the first two requests in each stream can be marked as a new stream and shown in bold, whereas the later requests are not.

In another implementation, the hardware could choose to mark each of the packets as a new stream, or it could choose to not modify the stream information based on Input VC switching. If it marked it as a new stream, there would appear to be no page locality among these requests. If it left it as is, the requests after B0 would appear to be all from the same stream, even though they are not all related.

Figure 6:
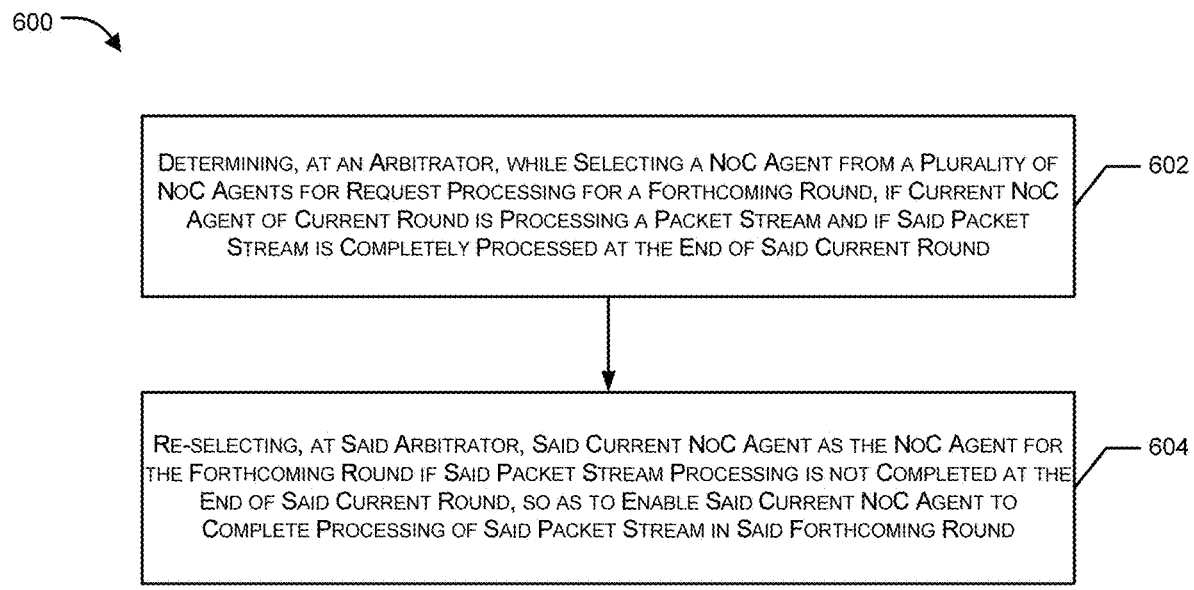
FIG. 6 illustrates a flow diagram showing working of the present invention in accordance with an example implementation.

FIG. 6 illustrates an exemplary flow diagram showing working of the invention in accordance with an example implementation of the present disclosure. At step 602, the method can include the step of determining, at an arbitrator, while selecting a NoC agent from a plurality of NoC agents for request processing for a forthcoming round, if current NoC agent of current round is processing a packet stream and if said packet stream is completely processed at the end of said current round, wherein processing of the packet stream enables cluster requests to be processed at same part of said memory and enhances page locality; and at step 604, the method can include the step of re-selecting, at said arbitrator, said current NoC agent as the NoC agent for the forthcoming round if said packet stream processing is not completed at the end of said current round, so as to enable said current NoC agent to complete processing of said packet stream in said forthcoming round.

Figure 7:
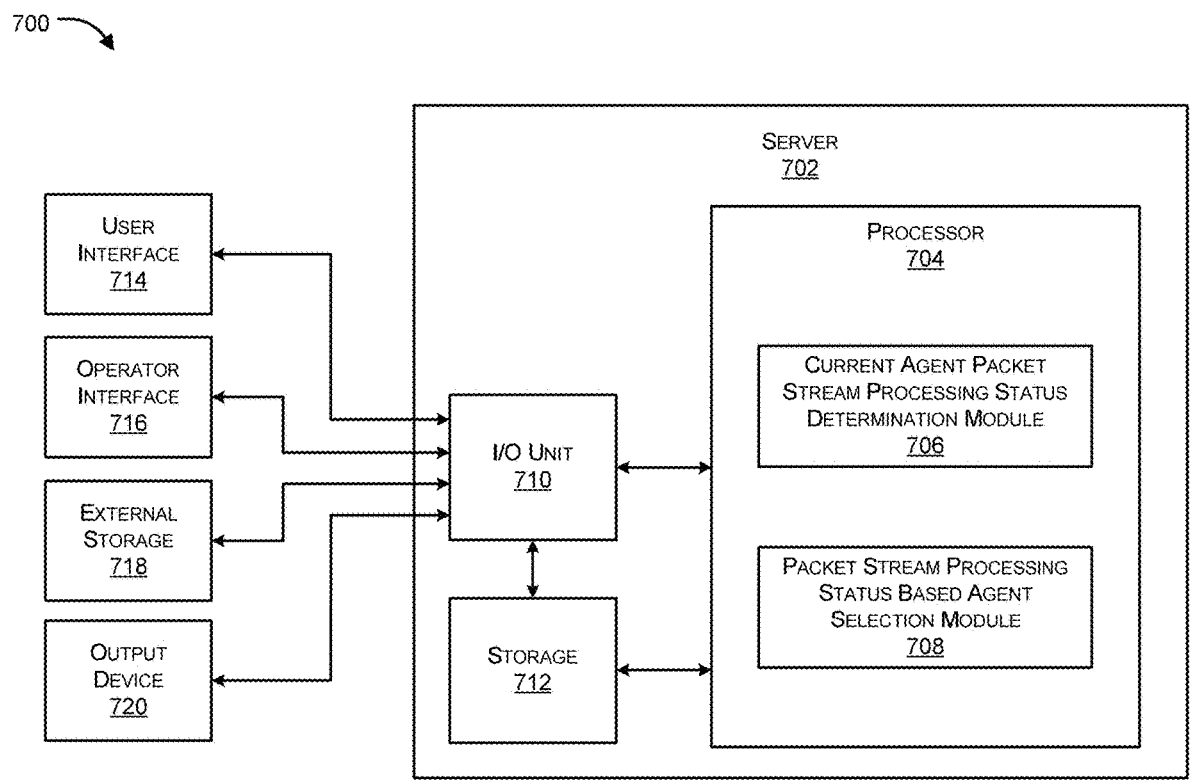
FIG. 7 illustrates an example computer system on which example embodiments may be implemented.

FIG. 7 illustrates an example computer system on which example embodiments may be implemented. This example system is merely illustrative, and other modules or functional partitioning may therefore be substituted as would be understood by those skilled in the art. Further, this system may be modified by adding, deleting, or modifying modules and operations without departing from the scope of the inventive concept.

In an aspect, computer system 700 includes a server 702 that may involve an I/O unit 710, storage 712, and a processor 704 operable to execute one or more units as known to one skilled in the art. The term "computer-readable medium" as used herein refers to any medium that participates in providing instructions to processor 704 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 714 and operator interfaces 716 which may utilize input devices such as a keyboard, mouse, touch device, or verbal command The server 702 may also be connected to an external storage 718, which can contain removable storage such as a portable hard drive, optical media (CD or DVD), disk media or any other medium from which a computer can read executable code. The server may also be connected an output device 720, such as a display to output data and other information to a user, as well as request additional information from a user. The connections from the server 702 to the user interface 714, the operator interface 716, the external storage 718, and the output device 720 may via wireless protocols, such as the 802.11 standards, Bluetooth® or cellular protocols, or via physical transmission media, such as cables or fiber optics. The output device 720 may therefore further act as an input device for interacting with a user.

The processor 704 can include a current agent packet stream processing status determination module 706 that can be configured to determine, at an arbitrator, while selecting a NoC agent from a plurality of NoC agents for request processing for a forthcoming round, if current NoC agent of current round is processing a packet stream and if said packet stream is completely processed at the end of said current round, wherein processing of the packet stream enables cluster requests to be processed at same part of said memory and enhances page locality; and a packet stream processing status based agent selection module 708 that can be configured to re-select, at said arbitrator, said current NoC agent as the NoC agent for the forthcoming round if said packet stream processing is not completed at the end of said current round, so as to enable said current NoC agent to complete processing of said packet stream in said forthcoming round.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

The invention claimed is:

1. A method for page locality based memory access request processing in a network-on-chip (NoC) architecture, said method comprising:
   determining, at an arbitrator, while selecting an NoC agent from a plurality of NoC agents for request processing for a forthcoming round, if a current NoC agent of a current round is processing a packet stream and if said packet stream is completely processed at the end of said current round, wherein processing of the packet stream enables cluster requests to be processed at a same part of a memory and enhances page locality; and
   re-selecting, at said arbitrator, said current NoC agent as the NoC agent for the forthcoming round if said packet stream processing is not completed at the end of said current round, so as to enable said current NoC agent to complete processing of said packet stream in said forthcoming round, wherein said determining of whether said packet stream is completely processed is performed based on receipt of new stream information, said new stream information being shared with each output port of a router associated with said arbitrator.

2. The method of claim 1, wherein if said packet stream processing is completed, said arbitrator selects the NoC agent having the next highest priority for the forthcoming round, and said current NoC agent is allocated lowest priority.

3. The method of claim 1, wherein said arbitrator is a round-robin based packet processing arbitrator.

4. The method of claim 1, wherein the arbitrator selects the NoC agent so as to enhance page locality without compromising on unfairness to said plurality of NoC agents beyond a defined threshold.

5. The method of claim 1, wherein said determining of whether said packet stream is completely processed is performed based on a stream indicator that forms part of said packet stream, such that said current NoC agent is selected in each forthcoming round until an end of packet stream indicator is received.

6. The method of claim 1, wherein said determining of whether said packet stream is completely processed is performed based on a destination address mentioned in each packet of said packet stream such that said current NoC agent is selected in each forthcoming round while the same destination address is mentioned in each packet of said packet stream.

7. The method of claim 1, wherein said determining of whether said packet stream is completely processed is performed based on an intimation from said current NoC agent that it is a part of said packet stream.

8. The method of claim 1, wherein said determining of whether said packet stream is completely processed is done by a master bridge by analyzing address stream that forms part of said packet stream.

9. A system for page locality based memory access request processing in a network-on-chip (NoC) architecture, said system comprising:
 a current agent packet stream processing status determination circuitry configured to determine, at an arbitrator, while selecting an NoC agent from a plurality of NoC agents for request processing for a forthcoming round, if a current NoC agent of a current round is processing a packet stream and if said packet stream is completely processed at the end of said current round, wherein processing of the packet stream enables cluster requests to be processed at a same part of a memory and enhances page locality,
 a packet stream processing status based agent selection circuitry configured to re-select, at said arbitrator, said current NoC agent as the NoC agent for the forthcoming round if said packet stream processing is not completed at the end of said current round, so as to enable said current NoC agent to complete processing of said packet stream in said forthcoming round, wherein said determining of whether said packet stream is completely processed is to be performed based on receipt of new stream information, said new stream information being shared with each output port of a router associated with said arbitrator.

10. The system of claim 9, wherein if said packet stream processing was completed, said arbitrator selects the NoC agent having the next highest priority for the forthcoming round, and said current NoC agent is allocated lowest priority.

11. The system of claim 9, wherein said arbitrator is a round-robin based packet processing arbitrator.

12. The system of claim 9, wherein the arbitrator selects the NoC agent so as to enhance page locality without compromising on unfairness to said plurality of NoC agents beyond a defined threshold.

13. The system of claim 9, wherein said determination of whether said packet stream is completely processed is to be performed based on any or a combination of: a stream indicator that forms part of said packet stream such that said current NoC agent is selected in each forthcoming round until an end of packet stream indicator is received, the destination address mentioned in each packet of said packet stream such that said current NoC agent is selected in each forthcoming round while the same destination address is mentioned in each packet of said packet stream, and an intimation from said current NoC agent that it is a part of said packet stream.

14. The system of claim 9, wherein said determination of whether said packet stream is completely processed is done by a master bridge by analyzing address stream that forms part of said packet stream.

15. A non-transitory computer readable storage medium storing instructions for executing a process, the instructions comprising:
 determining, at an arbitrator, while selecting an NoC agent from a plurality of NoC agents for request processing for a forthcoming round, if a current NoC agent of a current round is processing a packet stream and if said packet stream is completely processed at the end of said current round, wherein processing of the packet stream enables cluster requests to be processed at a same part of a memory and enhances page locality; and
 re-selecting, at said arbitrator, said current NoC agent as the NoC agent for the forthcoming round if said packet stream processing is not completed at the end of said current round, so as to enable said current NoC agent to complete processing of said packet stream in said forthcoming round, wherein said determining of whether said packet stream is completely processed is to be performed based on receipt of new stream information, said new stream information being shared with each output port of a router associated with said arbitrator.

16. The non-transitory computer readable storage medium according to claim 15, wherein if said packet stream processing was completed, said arbitrator selects the NoC agent having the next highest priority for the forthcoming round, and said current NoC agent is allocated lowest priority.

17. The non-transitory computer readable storage medium according to claim 15, wherein the arbitrator selects the NoC agent so as to enhance page locality without compromising on unfairness to said plurality of NoC agents beyond a defined threshold.

18. The non-transitory computer readable storage medium according to claim 15, wherein said determining of whether said packet stream is completely processed is performed based on any or a combination of: a stream indicator that forms part of said packet stream such that said current NoC agent is selected in each forthcoming round until an end of packet stream indicator is received, the destination address mentioned in each packet of said packet stream such that said current NoC agent is selected in each forthcoming round while the same destination address is mentioned in each packet of said packet stream, and an intimation from said current NoC agent that it is a part of said packet stream.

* * * * *